United States Patent
He et al.

(10) Patent No.: US 11,956,845 B2
(45) Date of Patent: Apr. 9, 2024

(54) TRANSMISSION OF SEGMENTS OF INFORMATION

(71) Applicant: Nokia Technologies Oy, Espoo (FI)

(72) Inventors: Jing He, Beijing (CN); Amaanat Ali, Espoo (FI); Ping Yuan, Beijing (CN); Malgorzata Tomala, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 308 days.

(21) Appl. No.: 17/625,061

(22) PCT Filed: Jul. 22, 2019

(86) PCT No.: PCT/CN2019/097162
§ 371 (c)(1),
(2) Date: Jan. 5, 2022

(87) PCT Pub. No.: WO2021/012168
PCT Pub. Date: Jan. 28, 2021

(65) Prior Publication Data
US 2022/0287130 A1 Sep. 8, 2022

(51) Int. Cl.
*H04W 76/19* (2018.01)
*H04W 28/06* (2009.01)

(52) U.S. Cl.
CPC .......... *H04W 76/19* (2018.02); *H04W 28/06* (2013.01)

(58) Field of Classification Search
CPC ... H04W 76/19; H04W 28/06; H04W 28/065; H04W 36/02; H04W 24/10; H04W 36/08; H04W 8/24
See application file for complete search history.

(56) References Cited

U.S. PATENT DOCUMENTS

2010/0124196 A1 5/2010 Bonar et al.
2010/0183031 A1 7/2010 Dalsgaard et al.
(Continued)

FOREIGN PATENT DOCUMENTS

CN 101043738 A 9/2007
CN 101048001 A 10/2007
(Continued)

OTHER PUBLICATIONS

Office action received for corresponding Chinese Patent Application No. 201980098680.6, dated Jun. 30, 2023, 13 pages of office action and no page of translation available.
(Continued)

*Primary Examiner* — Chae S Lee
(74) *Attorney, Agent, or Firm* — Robert P. Michal, Esq.; Carter, DeLuca & Farrell LLP

(57) ABSTRACT

Example embodiments of the present disclosure relate to a solution for transmitting or receiving segments of information. In an aspect, a first device generates a plurality of messages to be transmitted to a second device. Each of the plurality of messages comprises a segment of information to be provided to the second device. The first device transmits a part of the plurality of messages to the second device. In response to the first device being triggered to perform an operation with a higher priority than the transmission of the plurality of messages, the first device performs the operation by interrupting the transmission of rest of the plurality of messages to be transmitted. With example embodiments of the present disclosure, it is enabled that transmission of messages conveying information segments may be interrupted to perform an operation with a higher priority.

13 Claims, 11 Drawing Sheets

(56) References Cited

U.S. PATENT DOCUMENTS

| | | | |
|---|---|---|---|
| 2010/0240400 A1 | 9/2010 | Choi | |
| 2013/0039339 A1* | 2/2013 | Rayavarapu | H04W 76/19 370/329 |
| 2021/0218535 A1* | 7/2021 | Liang | H04L 5/0053 |
| 2022/0322141 A1* | 10/2022 | Wu | H04L 5/0048 |

FOREIGN PATENT DOCUMENTS

| | | |
|---|---|---|
| CN | 101675684 A | 3/2010 |
| CN | 101883406 A | 11/2010 |
| CN | 103370961 A | 10/2013 |
| CN | 103858440 A | 6/2014 |
| CN | 106576236 A | 4/2017 |
| CN | 108029066 A | 5/2018 |

OTHER PUBLICATIONS

"Remaining issues on UE capability segmentation", 3GPP TSG-RAN2 Meeting#106, R2-1907569, Huawei, May 13-17, 2019, pp. 1-3.

"Remaining issues on early data transmission over UP", 3GPP TSG-RAN WG2 #100, R2-1713055, Ericsson, Nov. 27-Dec. 1, 2017, pp. 1-6.

"New WI Proposal on optimisations on UE radio capability signalling", TSG RAN Meeting #RP-83, RP-190657, MediaTek Inc, Mar. 18-22, 2019, 4 pages.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

International Search Report and Written Opinion received for corresponding Patent Cooperation Treaty Application No. PCT/CN2019/097162, dated Apr. 26, 2020, 9 pages.

Office action received for corresponding Chinese Patent Application No. 201980098680.6, dated Dec. 15, 2023, 9 pages of office action and English translation, 10 pages, total 19 pages.

\* cited by examiner

TRANSMISSION OF SEGMENTS OF INFORMATION

RELATED APPLICATION

This application claims priority to PCT Application No. PCT/CN2019/097162, filed on Jul. 22, 2019, each of which is incorporated herein by reference in its entirety.

FIELD

Example embodiments of the present disclosure generally relate to the field of communication, and in particular to devices, methods, apparatuses and a computer readable medium for transmitting or receiving segments of information.

BACKGROUND

In a recent 3rd generation partnership project (3GPP) meeting, a new work item (WI) for optimizations on user equipment (UE) radio capability signaling is agreed. One aspect of the work objectives to perform the optimization is segmentation of UE radio capability signaling at radio resource control (RRC) layer. It is also agreed that radio access network (RAN) working group 2 (WG2) (RAN2) is to specify the mechanism for the segmentation of UE radio capability signaling at RRC, for example, for cases when the information amount of the UE capability exceeds the maximum size of a packet data convergence protocol (PDCP) service data unit (SDU).

In a more recent 3GPP meeting, some agreements have been reached for the segmentation of the UE radio capability signaling. For example, the RRC level segmentation is applied in the segmentation of the UE capability information. The RRC message shall be encoded first according to the abstract syntax notation one (ASN.1) before the segmentation, and the segmentation shall be processed on the octet strings of the encoded RRC message. After the segmentation, each segment of the encoded RRC message (octet strings) shall be encapsulated into a separate RRC message. Each uplink message segment carries a segment number, and the maximum number of the segments is 16. In addition, a working assumption is proposed for the segmentation of the UE radio capability signaling, that is, there will be no interleaving of different messages.

SUMMARY

In general, example embodiments of the present disclosure provide a solution for transmitting or receiving segments of information.

In a first aspect, there is provided a first device. The first device comprises at least one processor and at least one memory storing computer program codes. The at least one memory and the computer program codes are configured to, with the at least one processor, cause the first device to generate a plurality of messages to be transmitted to a second device. Each of the plurality of messages comprises a segment of information to be provided to the second device. The at least one memory and the computer program codes are also configured to, with the at least one processor, cause the first device to transmit a part of the plurality of messages to the second device. The at least one memory and the computer program codes are further configured to, with the at least one processor, cause the first device to, in response to the first device being triggered to perform an operation with a higher priority than the transmission of the plurality of messages, perform the operation by interrupting the transmission of rest of the plurality of messages to be transmitted.

In a second aspect, there is provided a second device. The second device comprises at least one processor and at least one memory storing computer program codes. The at least one memory and the computer program codes are configured to, with the at least one processor, cause the second device to receive a part of a plurality of messages from a first device. Each of the plurality of messages comprises a segment of information to be provided to the second device. The at least one memory and the computer program codes are also configured to, with the at least one processor, cause the second device to, in response to the first device interrupting the transmission of rest of the plurality of messages to perform an operation with a higher priority than the transmission of the plurality of messages, process the received part of the plurality of messages.

In a third aspect, there is provided a third device. The third device comprises at least one processor and at least one memory storing computer program codes. The at least one memory and the computer program codes are configured to, with the at least one processor, cause the third device to establish a communication connection with a first device previously communicating with a second device. The first device has transmitted to the second device a part of a plurality of messages to be transmitted from the first device to the second device. Each of the plurality of messages comprises a segment of information to be provided to the second device. The at least one memory and the computer program codes are also configured to, with the at least one processor, cause the third device to receive, from the first device or the second device, an indication indicating that the transmission of rest of the plurality of messages is interrupted. The at least one memory and the computer program codes are further configured to, with the at least one processor, cause the third device to transmit, to the first device, an indication indicating whether the first device transmits the rest of the plurality of messages to the third device.

In a fourth aspect, there is provided a method. The method comprises generating, at a first device, a plurality of messages to be transmitted to a second device. Each of the plurality of messages comprises a segment of information to be provided to the second device. The method also comprises transmitting a part of the plurality of messages to the second device. The method further comprises in response to the first device being triggered to perform an operation with a higher priority than the transmission of the plurality of messages, performing the operation by interrupting the transmission of rest of the plurality of messages to be transmitted.

In a fifth aspect, there is provided a method. The method comprises receiving, at a second device, a part of a plurality of messages from a first device. Each of the plurality of messages comprises a segment of information to be provided to the second device. The method also comprises in response to the first device interrupting the transmission of rest of the plurality of messages to perform an operation with a higher priority than the transmission of the plurality of messages, processing the received part of the plurality of messages.

In a sixth aspect, there is provided a method. The method comprises establishing, at a third device, a communication connection with a first device previously communicating with a second device. The first device has transmitted to the second device a part of a plurality of messages to be transmitted from the first device to the second device. Each of the plurality of messages comprises a segment of information to be provided to the second device. The method also comprises receiving, from the first device or the second device, an indication indicating that the transmission of rest of the plurality of messages is interrupted. The method further comprises transmitting, to the first device, an indication indicating whether the first device transmits the rest of the plurality of messages to the third device.

In a seventh aspect, there is provided an apparatus. The apparatus comprises means for generating, at a first device, a plurality of messages to be transmitted to a second device. Each of the plurality of messages comprises a segment of information to be provided to the second device. The apparatus also comprises means for transmitting a part of the plurality of messages to the second device. The apparatus further comprises means for, in response to the first device being triggered to perform an operation with a higher priority than the transmission of the plurality of messages, performing the operation by interrupting the transmission of rest of the plurality of messages to be transmitted.

In an eighth aspect, there is provided an apparatus. The apparatus comprises means for receiving, at a second device, a part of a plurality of messages from a first device. Each of the plurality of messages comprises a segment of information to be provided to the second device. The apparatus also comprises means for, in response to the first device interrupting the transmission of rest of the plurality of messages to perform an operation with a higher priority than the transmission of the plurality of messages, processing the received part of the plurality of messages.

In an ninth aspect, there is provided an apparatus. The apparatus comprises means for establishing, at a third device, a communication connection with a first device previously communicating with a second device. The first device has transmitted to the second device a part of a plurality of messages to be transmitted from the first device to the second device. Each of the plurality of messages comprises a segment of information to be provided to the second device. The apparatus also comprises means for receiving, from the first device or the second device, an indication indicating that the transmission of rest of the plurality of messages is interrupted. The apparatus further comprises means for transmitting, to the first device, an indication indicating whether the first device transmits the rest of the plurality of messages to the third device.

In a tenth aspect, there is provided a non-transitory computer readable medium storing program instructions for causing an apparatus to perform at least the method according to the fourth, fifth, or sixth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
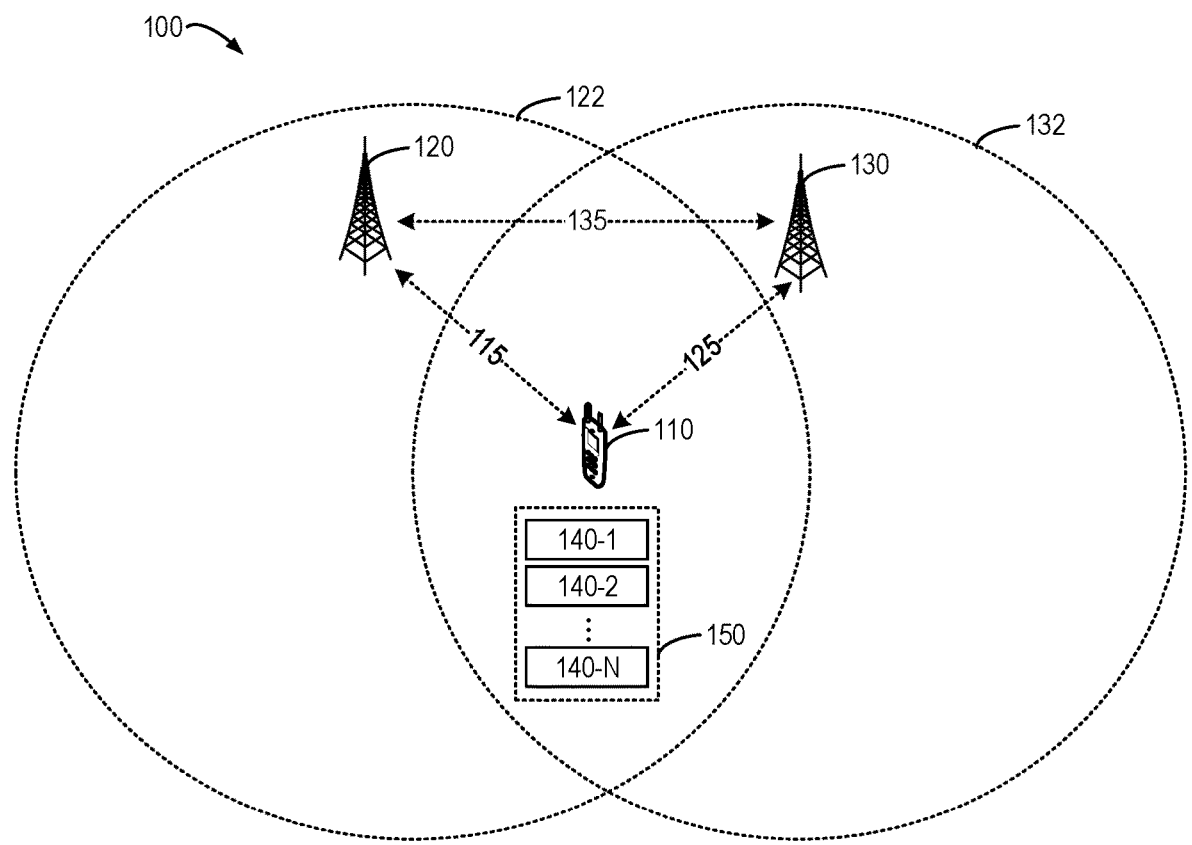
FIG. 1 illustrates a schematic diagram of a communication environment in which some example embodiments of the present disclosure can be implemented.

Principles of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every example embodiment includes the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" or the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, components and/or the like, but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned, a working assumption is proposed for the segmentation of the UE radio capability signaling, namely, there will be no interleaving of different messages. In particular, this working assumption in RAN2 means that the messages (for example, new uplink messages) for the segmentation should not be interrupted by other messages, for example, uplink or downlink RRC messages. However, in practice, interleaving with other messages may be unavoidable in some use cases, and some communication procedures (for example, RRC procedures) may interrupt the new uplink message for transmission of information segments.

When this happens, it is likely that the receiving network device only receives some segments of the UE capability information but may miss some segments, or some unsent segments are remained in the UE. If so, the network device cannot decode these received segments, as each segment may not be designed to be self-decoded. In such cases, it is unclear how the network device (such as, a gNB) handle these received segments when another procedure interrupts the transmission of the information segments. It is also unclear how the UE handle those unsent information segments.

In view of the above problems and other potential problems in the traditional solutions, example embodiments of the present disclosure provide a solution for transmitting or receiving segments of information to handle abnormal scenarios for sending a large amount of information (such as, UE radio capability information) that exceeds the conveying capacity of a single message (such as, a RRC message), especially in the case that the segmenting operation on the information in the UE is unexpectedly interrupted. With example embodiments of the present disclosure, it is enabled that transmission of messages conveying information segments may be interrupted to perform an operation with a higher priority. Principles and implementations of example embodiments of the present disclosure will be described in detail below with reference to the figures.

FIG. 1 illustrates a schematic diagram of a communication environment (system) 100 in which some example embodiments of the present disclosure can be implemented. The communication environment 100 may include a first device 110 located within the coverage 122 (also referred to as a serving cell 122) of a second device 120, which provides a wireless connection for the first device 110. The second device 120 may communicate with the first device 110 via a communication channel 115, such as a wireless channel 115. As shown in FIG. 1, the first device 110 is also located in a cell 132 of a third device 130. Thus, the first device 110 may establish a communication connection with the third device 130 and then perform communications through the cell 132 via a communication channel 125, such as a wireless channel 125.

In some cases, the first device 110 may be handed over from the second device 120 to the third device 130. In such a handover, the second device 120 may also be referred to as a source device, and the third device 130 may also be referred to as a target device. In some other cases, the first device 110 may detect a radio link failure during the communication with the second device 120, and can re-establish a communication connection to the third device 130. In such a re-establishment, the second device 120 may also be referred to as an original communicating device, and the third device 130 may also be referred to as a new communicating device. In some further example embodiments, upon detecting a radio link failure, the first device 110 may re-establish a communication connection again to the second device 120. In addition, in order to facilitate the establishment of the communication connection between the first device 110 and the third device 130, the second device 120 may communicate with the third device 130 via a communication channel 135, and can transmit various information of the first device 110 to the third device 130.

During a communication between the first device 110 and the second device 120, the first device 110 may need to provide information 150 to the second device 120. For example, the second device 120 may request the first device 110 to provide the radio capability information of the first device 110 to the second device 120, by sending to the first device 110 a "UECapabilityEnqiry" message as defined in the 3GPP specifications. It is to be understood that the radio capability information is described here only for the purpose of illustration without suggesting any limitations. In other example embodiments, the information 150 may be any possible information that may be transmitted between devices in communication with each other.

In general, the first device 110 may provide the information 150 to the second device 120 by transmitting a message (such as, a RRC message) containing the information 150. However, in some cases, the information amount of the information 150 may be large, such that the information 150 cannot be contained in a signal message, due to the limited conveying capacity of a signal message. In this event, the first device 110 can divide the information 150 or the large message containing the information 150 into a number of segments. Then, the first device 110 may generate and transmit a plurality of messages 140-1 to 140-N to the second device 120. Each of the messages 140-1 to 140-N includes a segment of the information 150. In some example embodiments, the maximum value of the number N of the segments may be 16. However, example embodiments of the present disclosure are equally applicable to any suitable value of N, which may be greater than 16 or less than 16.

In some example embodiments, the first device 110 may be a terminal device, and the second and third devices 120 and 130 may be network devices. In some other example embodiments, the first, second, and third devices 110, 120, and 130 may be any other suitable communication devices, which can communicate with one another. Example embodiments of the present disclosure are not limited to the example scenario of FIG. 1. In this regard, it is noted that although the first device 110 are schematically depicted as a mobile phone and the second and third devices 120 and 130 are schematically depicted as base stations in FIG. 1, it is understood that this depiction is only for example without suggesting any limitation. In addition, it is noted that example embodiments of the present disclosure can be applicable to both the uplink transmissions, in which a terminal device transmits messages to a network device, and the downlink transmissions, in which a network device transmits messages to a terminal device.

It is to be understood that the number of communication devices, the number of communication channels, the number of information segments, and the number of other elements as shown in FIG. 1 are only for the purpose of illustration without suggesting any limitations. The communication environment 100 may include any suitable number of communication devices, any suitable number of communication channels, any suitable number of information segments, and any suitable number of other elements adapted for implementing example embodiments of the present disclosure. Although not shown, it would be appreciated that all the devices and other function entities may belong to and be located in the same communication network or different communication networks.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
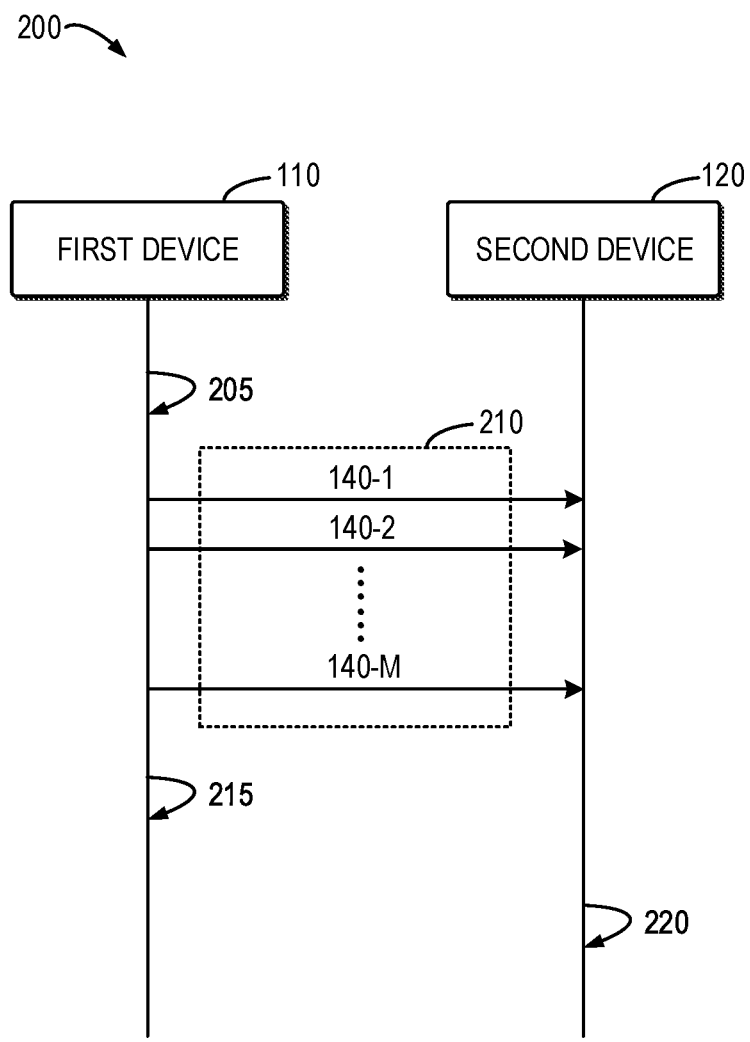
FIG. 2 illustrates an example communication process between a first device and a second device in accordance with some example embodiments of the present disclosure.

Reference is now made to FIG. 2, which illustrates an example communication process 200 between the first device 110 and the second device 120 in accordance with some example embodiments of the present disclosure. For the purpose of discussion, the communication process 200 will be described with reference to FIG. 1. However, it would be appreciated that the communication process 200 may be equally applicable to other communication scenarios where segmentation of information is performed for transmitting the information. For example, in some example embodiments, the first device 110 may be a terminal device and the second device 120 may be a network device. In some other example embodiments, the first device 110 may be a network device and the second device 120 may be a terminal device.

As shown in FIG. 2, the first device 110 generates 205 the messages 140-1 to 140-N to be transmitted to the second device 120. Each of the messages 140-1 to 140-N includes a segment of information 150 to be provided to the second device 120. As used herein, the notation "N" represents an integer greater than 1, and its specific value can be configurable, for example, based on particular technical environments and design requirements. In some example embodiments, the information 150 may include the radio capability information of the first device 110. However, example embodiments of the present disclosure are equally applicable to any information that can be transmitted between devices in communication with each other.

The first device 110 can generate 205 the plurality of messages 140-1 to 140-N in various manners. For example, the first device 110 may first generate an original message based on the information 150. Afterwards, the first device 110 can encode the original message, and then segment the encoded message to a number of segments. After the segmentation, the first device 110 may encapsulate each segment of the encoded message into one of the messages 140-1 to 140-N.

It is to be understood that such a generation process of the messages 140-1 to 140-N is described only for the purpose of illustration and help those skilled in the art to understand and implement the present disclosure, without suggesting any limitation as to the scope of the disclosure. In some other example embodiments, one or more operations in the described generation process can be omitted. For example, the original message can be divided into segments without encoding. Alternatively, the first device 110 may directly divide the information 150 into a number of segments, and then encapsulate each segment of the information 150 into one of the messages 140-1 to 140-N.

Continuing with reference to FIG. 2, after generating the messages 140-1 to 140-N, the first device 110 can then transmit them to the second device 120, for example, one by one. However, in some example embodiments, the transmission of the messages 140-1 to 140-N may be interrupted by another operation with a higher priority. In general, the operation interrupting the transmission can be any existing or future operation that should be performed before the transmission of the segments of the information 150. For example, the operation may include a measurement of a communication channel, a handover between different network devices, or a re-establishment of a communication connection, and the like. In particular, a "MeasurementReport" procedure as defined in the 3GPP specifications may be initiated by the first device 110 when a configured criterion for the measurement is reached, a handover procedure may be triggered by the second device 120, and the second device 120 can send an "RRCReconfiguration" message as defined in the 3GPP specifications to the first device 110 for an intra-radio access technology (RAT) handover or a "MobilityFromNRCommand" message as defined in the 3GPP specifications for an inter-RAT handover. Moreover, a re-establishment procedure may be initiated upon a detected radio link failure of the first device 110.

In principle, a handover procedure or a re-establishment procedure may have a higher priority than the transmission of the messages 140-1 to 140-N, otherwise an issue of a late handover may be occur and may even result in losing the communication connection. It is more critical especially in the scenario with poor radio frequency (RF) quality, which may trigger a coverage-based handover, or the scenario with high round trip time, RTT, (such as tens of milliseconds up to hundreds of milliseconds which can be seen in non-terrestrial networks).

Furthermore, the RRC specification may have set standardized values for processing delays of particular RRC procedures (for example, see section 12 of TS 38.331). Given the standardized values, it also becomes clear in the light of the standards that a transfer of UE capability information cannot take precedence over some RRC procedures, for which performance requirements are more critical to mitigate delays.

More specifically, during the transmission of the messages 140-1 to 140-N, the first device 110 may be triggered to transmit a "MeasurementReport" message as defined in the 3GPP specifications. In this event, the transmission of the messages 140-1 to 140-N may be interrupted by the "MeasurementReport" message, since it should be sent immediately when a measurement reporting event is triggered for radio resource management (RRM) purposes. If a following handover is triggered, the transmission of the messages 140-1 to 140-N may be further interrupted by messages for a handover procedure, such as an "RRCReconfiguration" message as defined in the 3GPP specifications.

The same issue may appear in a re-establishment scenario due to a radio link failure of the first device 110, which can also change the RRC messages priorities. In the re-establishment procedure, the first device 110 may need to transmit an "RRCReestablishmentRequest" message as defined in the 3GPP specifications to the second device 120, then the second device 120 may need to transmit an "RRCReestablishment" message as defined in the 3GPP specifications to the first device 110, and afterwards, the first device 110 may need to transmit an "RRC Re-establishmentComplete" message as defined in the 3GPP specifications to the second device 120.

It is seen that these RRM procedures (such as, the measurement performance and corresponding reporting), a handover procedure, or a re-establishment procedure can disrupt the transmission order of the messages to be transmitted, and may take over the priorities or grants over the transmission of messages regarding segmentation procedure.

Continuing with reference to FIG. 2, as a result of the interruption by the operation with a higher priority, the first device 110 only transmits 210 a part of the messages 140-1 to 140-N to the second device 120. For ease of description, this part of the messages 140-1 to 140-N may be denoted as messages 140-1 to 140-M, where the notation "M" represents an integer greater than or equal to 1 and less than "N." In other words, when the first device 110 is triggered to perform the operation with a higher priority, the first device 110 has transmitted the messages 140-1 to 140-M to the second device 120, and the messages 140-M+1 to 140-N has not been transmitted to the second device 120.

That is, if the first device 110 is triggered to perform 215 an operation with a higher priority than the transmission of the plurality of messages 140-1 to 140-N, the first device 110 can perform 215 the operation by interrupting the transmission of the messages 140-M+1 to 140-N. Accordingly, at the receiving side, the second device 120 receives 210 the messages 140-1 to 140-N from the first device 110, and the messages 140-M+1 to 140-N have not been received by the second device 120.

In addition, if the first device 110 interrupts the transmission of the messages 140-M+1 to 140-N to perform 215 the operation, the second device 120 processes 220 the received messages 140-1 to 140-M. The second device 120 can handle the received messages 140-1 to 140-M in different manners. In some example embodiments, the second device 120 may just discard the received messages 140-1 to 140-M, since the transmission of the messages 140-M+1 to 140-N is interrupted and the received messages 140-1 to 140-M cannot be decoded without the messages 140-M+1 to 140-N. In these example embodiments, the second device 120 may initiate another new transmission of segments of the information 150, after the operation with a higher priority is complete. For example, if the information 150 includes radio capability information of the first device 110, the first device 110 may abort the interrupted segmentation procedure of the capability information.

In this event, since the first device 110 does not need to resume the transmission of the messages 140-M+1 to the 140-N, the first device 110 can also discard the messages 140-M+1 to the 140-N. In some example embodiments, the first device 110 can discard the messages 140-M+1 to the 140-N upon expiration of a predefined period for transmitting the messages 140-1 to 140-N. In this way, the flexibility of the time period for discarding the messages 140-M+1 to the 140-N can be improved. In some example embodiments, discarding the messages 140-M+1 to the 140-N may be triggered according to a rule specified by the future specifications. That is, in determining to release the procedure for transmission of the messages 140-M+1 to the 140-N, the first device 110 can determine the release either by being fixedly triggered according to the standard (for example, if a procedure of UE Capability Enquiry is interrupted by an RRC procedure) or through a timer, for example, a timer defined for handling the procedure of UE Capability Enquiry.

With the option of aborting the incomplete transmission of the messages 140-1 to 140-N, the existing RRC signaling can remain unchanged, but new behavior of a network device (for example, the second device 120) and a terminal device (for example, the first device 110) shall be defined and standardized into future 3GPP specifications.

As another option, in the case that the transmission of the messages 140-M+1 to 140-N are interrupted by the operation with a higher priority, instead of discarding the messages 140-M+1 to 140-N, the first device 110 can resume the transmission of them after the operation is complete. In this option, the transmission of the messages 140-M+1 to 140-N is suspended but not aborted. Both the first device 110 and the second device 120 can maintain the status of the interrupted transmission, and can trigger the transmission to resume or continue after successful completion of the prioritized operation performed in the meantime. With this option, a repeated transmission of the messages 140-1 to 140-M in the air interface can be avoided, and thus the air resources can be saved. Another advantage of this option is that a solution for resuming the interrupted transmission of segments of information can be standardized by designing and supporting new signaling. This option will be detailed below with reference to FIGS. 3 and 4.

Figure 3:
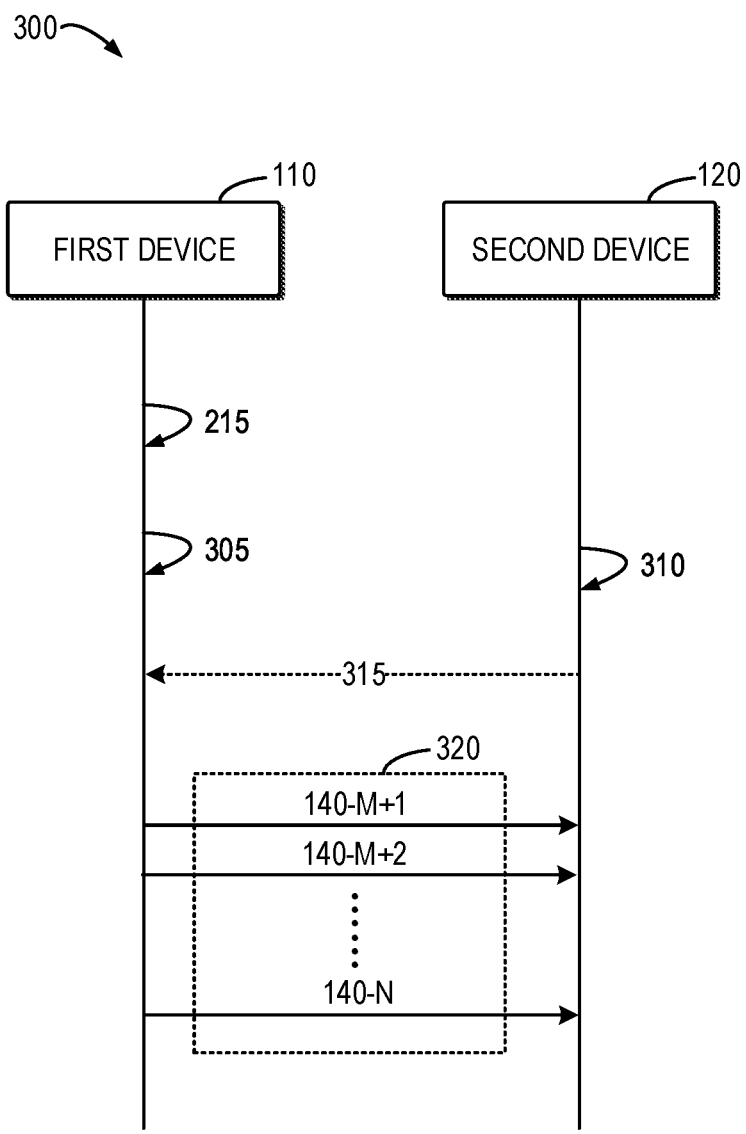
FIG. 3 illustrates another example communication process between a first device and a second device in accordance with some example embodiments of the present disclosure.

FIG. 3 illustrates another example communication process 300 between the first device 110 and the second device 120 in accordance with some example embodiments of the present disclosure. The communication process 300 may be considered as another example embodiment of the communication process 200 as shown in FIG. 2. For the purpose of discussion, the communication process 300 will be described with reference to FIG. 1. However, it would be appreciated that the communication process 300 may be equally applicable to other communication scenarios where segmentation of information is performed for transmitting the information.

As shown in FIG. 3, after the first device 110 is triggered to perform 215 the operation with a higher priority, the first device 110 may store 305 the messages 140-M+1 to 140-N that have not been transmitted to the second device 120. Therefore, upon the completion of the operation, the first device 110 can resume the transmission of the messages 140-M+1 to 140-N. In some example embodiments, the storing of the messages 140-M+1 to 140-N may be performed when a random access channel (RACH) access to the second device 120 or the third device 130 is requested.

The manner in which the first device 110 resumes the transmission of the messages 140-M+1 to 140-N may depend on the operation which interrupts the transmission of the messages 140-M+1 to 140-N. For example, if the operation is a re-establishment of a communication connection to the second device 120, then the receiving device of the messages 140-M+1 to 140-N is the same as the receiving device of the messages 140-1 to 140-M. In this event, upon the completion of the re-establishment to the second device 120, the first device 110 can resume the transmission of 140-M+1 to 140-N, by transmitting 320 the 140-M+1 to 140-N to the second device 120, for example, one by one.

At the second device 120, referring to both FIGS. 2 and 3, if the operation to be performed by the first device 110 is a re-establishment of a communication connection to the second device 120, then in processing 220 the messages 140-1 to 140-M, the second device 120 may store 310 them. Then, the second device 120 can continue to receive the messages 140-M+1 to 140-N from the first device 110, and thus complete the whole transmission of the messages 140-1 to 140-N. As such, in the scenario of the re-establishment of the communication connection to the second device 120, there is no need to retransmit the messages 140-1 to 140-M from the first device 110 to the second device 120, thereby saving the communication resources and processing resources for the retransmission. Afterwards, the second device 120 can obtain the information 150 from the received messages 140-1 to 140-N.

In some example embodiments, the transmission of the messages 140-M+1 to 140-N can be triggered by the second device 120. For example, after the re-establishment is complete, the second device 120 can transmit 315, to the first device 110, a sequence number (for example, M+1) of the message to be transmitted from the first device 110 to the second device 120. For example, if there is no message in the messages 140-1 to 140-M missed by the second device 120, that is, the second device 120 has received all of the messages 140-M+1 to 140-N, the second device 120 can determine that the next message needs to be received is the message 140-M+1, then the second device 120 may transmit 315 the sequence number M+1 of the message 140-M+1 to the first device 110. Alternatively, if the second device 120 has missed one or more of the messages 140-1 to 140-M, the second device 120 can inform the first device 110 of the sequence numbers of the missed messages.

Accordingly, the first device 110 may receive 315, from the second device 120, the sequence number of the message to be transmitted from the first device 110 to the second device 120. Then, the first device 110 can start the transmission 320 of the messages 140-M+1 to 140-N, by transmitting the message having the sequence number to the second device 120. In this way, the transmission of the messages 140-M+1 to 140-N or the retransmission of the missed messages can be controlled by the second device 120 as the receiving device. In some example embodiments, the sequence number of the expected message may be transmitted via a new designed RRC message. For example, for both the handover case and the re-establishment case, the "UECapabilityEnquiry" message as defined in the 3GPP specifications can be extended to include the sequence number, whereas for the re-establishment case, the "RRCReestablishment" message as defined in the 3GPP specifications can be extended to include the sequence number.

Figure 4:
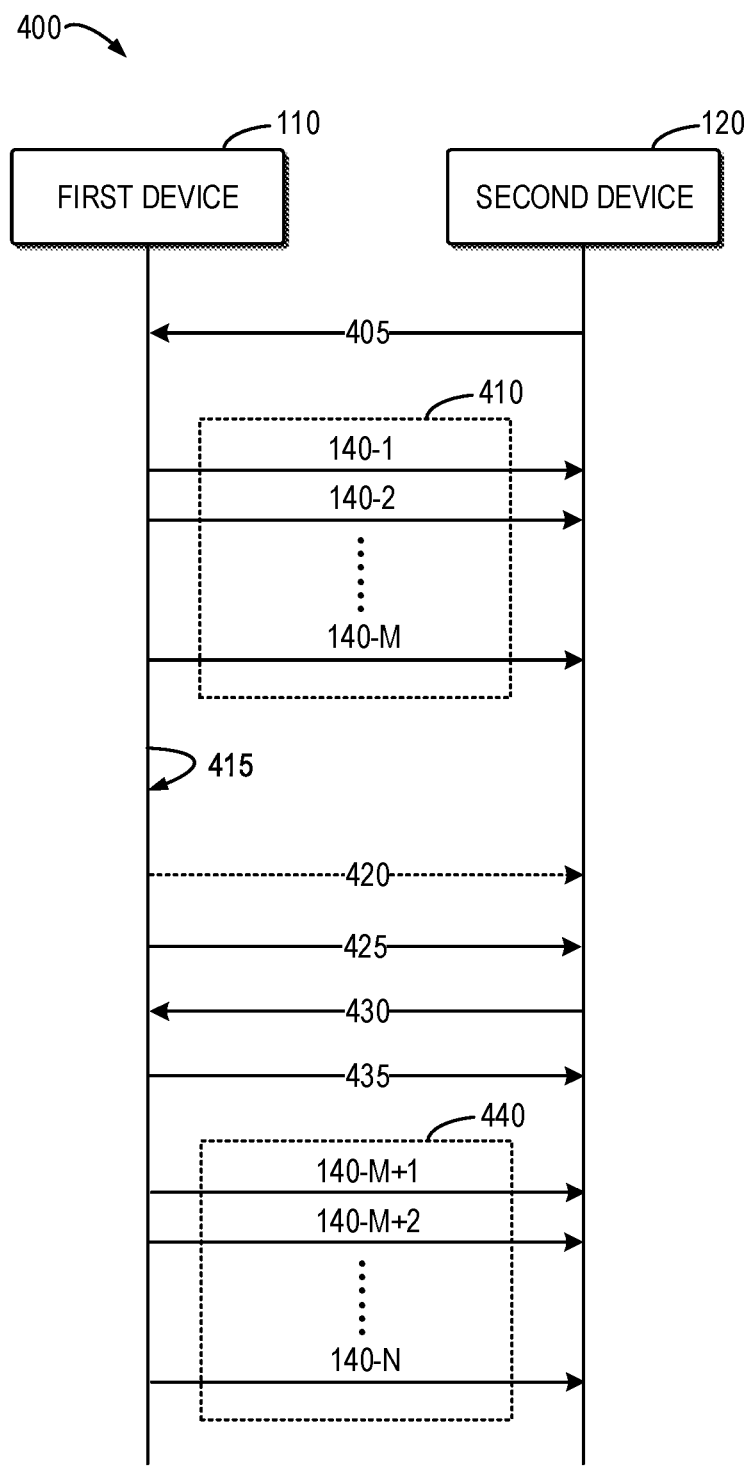
FIG. 4 illustrates another example communication process among a first device, a second device, and a third device in accordance with some example embodiments of the present disclosure.

FIG. 4 illustrates another example communication process 400 between the first device 110 and the second device 120 in accordance with some example embodiments of the present disclosure. The communication process 400 may be considered as another example embodiment of the communication process 300 as shown in FIG. 3, such as, for the scenario in which the first device 110 re-establishes a communication connection to the second device 120. For the purpose of discussion, the communication process 400 will be described with reference to FIG. 1. However, it would be appreciated that the communication process 400 may be equally applicable to other communication scenarios where segmentation of information is performed for transmitting the information.

As shown in FIG. 4, the second device 120 transmits 405 to the first device 110 a "UECapabilityEnquiry" message as defined in the 3GPP specifications. The first device 110 transmits 410 the messages 140-1 to 140-M to the second device 120. The first device 110 initiates 415 a re-establishment procedure to the second device 120, for example, due to a detected radio link failure. The first device 110 initiates 420 a RACH access procedure associated with the second device 120. The first device 110 transmits 425 to the second device 120 an "RRCReestablishmentReuqest" message as defined in the 3GPP specifications. The second device 120 transmits 430 to the first device 110 an "RRCReestablishment" message as defined in the 3GPP specifications, which may include a sequence number of the message to be transmitted from the first device 110 to the second device 120. The first device 110 transmits 435 to the second device 120 an "RRCReestablishmentComplete" message as defined in the 3GPP specifications. The first device 110 transmits 440 to the second device 120 the messages 140-M+1 to 140-N.

Figure 5:
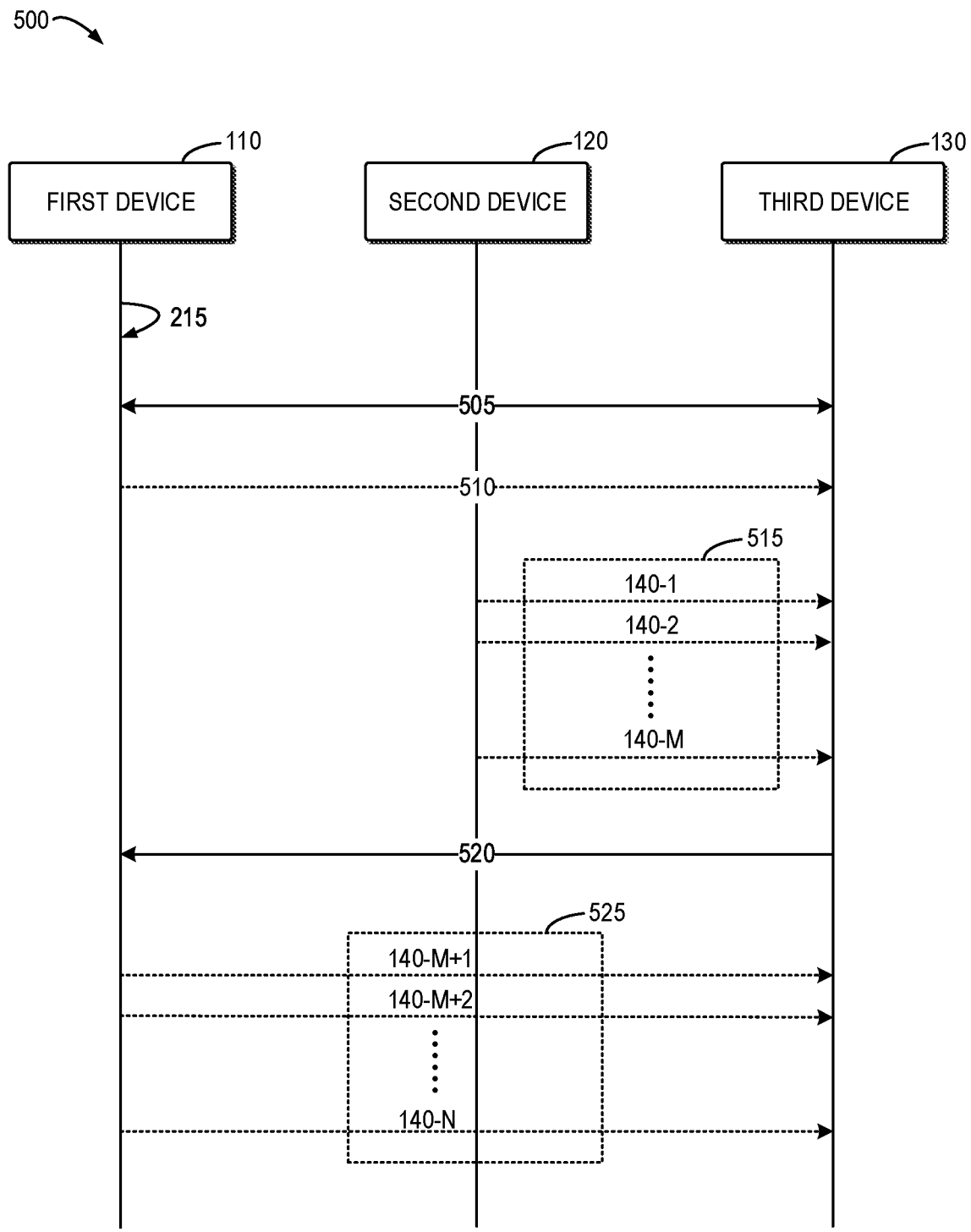
FIG. 5 illustrates an example communication process among a first device, a second device, and a third device in accordance with some example embodiments of the present disclosure.

FIG. 5 illustrates an example communication process 500 among the first device 110, the second device 120, and the third device 130 in accordance with some example embodiments of the present disclosure. The communication process 500 may be considered as another example embodiment of the communication process 200 as shown in FIG. 2. For the purpose of discussion, the communication process 500 will be described with reference to FIG. 1. However, it would be appreciated that the communication process 500 may be equally applicable to other communication scenarios where segmentation of information is performed for transmitting the information.

As shown in FIG. 5, the first device 110 performs 215 the operation with a higher priority by interrupting the transmission of the messages 140-M+1 to 140-N. As mentioned, the operation with a higher priority may be a handover of the first device 110 from the second device 120 to the third device 130. Alternatively, the operation with a higher priority may be re-establishment of a communication connection to the third device 130. In both the handover case and re-establishment case, the third device 130 establishes 505 a communication connection with the first device 110 which previously communicates with the second device 120. It is noted that, when the first device 110 establishes 505 the communication connection with the third device 130, the first device 110 has transmitted the messages 140-1 to 140-M to the second device 120, and the messages 140-M+1 to 140-N are not transmitted to the second device 120.

Upon establishing 505 the communication connection with the first device 110, the third device 130 may receive 510 from the first device 110 an indication indicating that the transmission of the messages 140-M+1 to 140-N is interrupted. For example, for the sake of simplicity, this indication may only indicate to the third device 130 the fact that the transmission of the messages 140-1 to 140-N is ongoing and incomplete, prior to the first device 110 connects to the third device 130. In some example embodiments, for the handover case, this indication can be carried in the "AS-Config" message as defined in the 3GPP specifications or any other messages related to the handover procedure, whereas for the re-establishment case, this indication can be transmitted by the first device 110 via the "RRCSetupComplete" message or "RLFreport" as defined in the 3GPP specifications (if an associated report is transmitted). As another option, this simple indication can also be transmitted by the second device 120 instead of the first device 110.

Alternatively, as an implicit indication of the interrupted transmission, the third device 130 may receive 515, from the second device 120, the messages 140-1 to 140-M that have been received by the second device 120. In other words, with reference to FIGS. 2 and 5, in processing 220 the received messages 140-1 to 140-M, if the operation interrupting the transmission of messages 140-M+1 to 140-N is a handover from the second device 120 to the third device 130 or a re-establishment of a communication connection to the third device 130, the second device 120 may transmit 515 messages 140-1 to 140-M to the third device 130. In this way, the first device 110 does not need to retransmit messages 140-1 to 140-M to the third device 130, thereby saving the communication resources and processing resources for the retransmission.

In some example embodiments, in order to enable the third device 130 to determine which of the messages 140-1 to 140-N have been received by the second device 120, the second device 120 may also transmit, to the third device 130, the respective sequence numbers of the messages 140-1 to 140-M. For example, this transmission may be performed via a new designed Xn interface between the second device 120 and the third device 130. In particular, for the handover case, the "Xn/SN STATUS TRANSFER" message as defined in the 3GPP specifications can be extended for this transmission, whereas for the re-establishment case, the "Xn/RETRIEVE UE CONTEXT RESPONSE" message can be extended for this transmission.

After receiving the indication of the interrupted transmission from the first device 110 or the second device 120, the third device 130 transmits 520, to the first device 110, an indication indicating whether the first device 110 transmits the messages 140-M+1 to 140-N to the third device 130 or not. In other words, the third device 130 may decide by its own implementation whether to continue the transmission of the messages 140-M+1 to 140-N.

In the case that the indication transmitted from the third device 130 indicates that the transmission of the messages 140-M+1 to 140-N is to continue, the third device 130 can receive 515 from the second device 120 the messages 140-1 to 140-M that have been received by the second device 120, and additionally the first device 110 may transmit 525 the messages 140-M+1 to 140-N to the third device 130. In other words, if the operation interrupting the transmission of the messages 140-M+1 to 140-N is a handover from the second device 120 to the third device 130 or a re-establishment of a communication connection to the third device 130, the first device 110 can resume the transmission of the messages 140-M+1 to 140-N, by transmitting 525 the messages 140-M+1 to 140-N to the third device 130 instead of the second device 120. As such, in the scenario of the handover from the second device 120 to the third device 130 or the re-establishment of the communication connection to the third device 130, there is no need to retransmit the messages 140-M+1 to 140-N from the first device 110 to the third device 130, thereby saving the communication resources and processing resources for the retransmission.

In some example embodiments, upon receiving 515 the messages 140-M+1 to 140-N from the second device 120 and/or their sequence numbers, the third device 130 can thus determine the next message needs to be transmitted by the first device 110. Afterwards, the third device 130 may transmit to the first device 110 a sequence number (for example, M+1) of the message to be transmitted from the first device 110 to the third device 130. Accordingly, the first device 110 receives, from the third device 130, the sequence number of the message to be transmitted, and then can start the transmission of the messages 140-M+1 to 140-N by transmitting the message having the sequence number to the third device 130, that is, the message M+1. In this way, the transmission of the messages 140-M+1 to 140-N or the retransmission of the missed messages can be controlled by the third device 130 as the receiving device.

Figure 6:
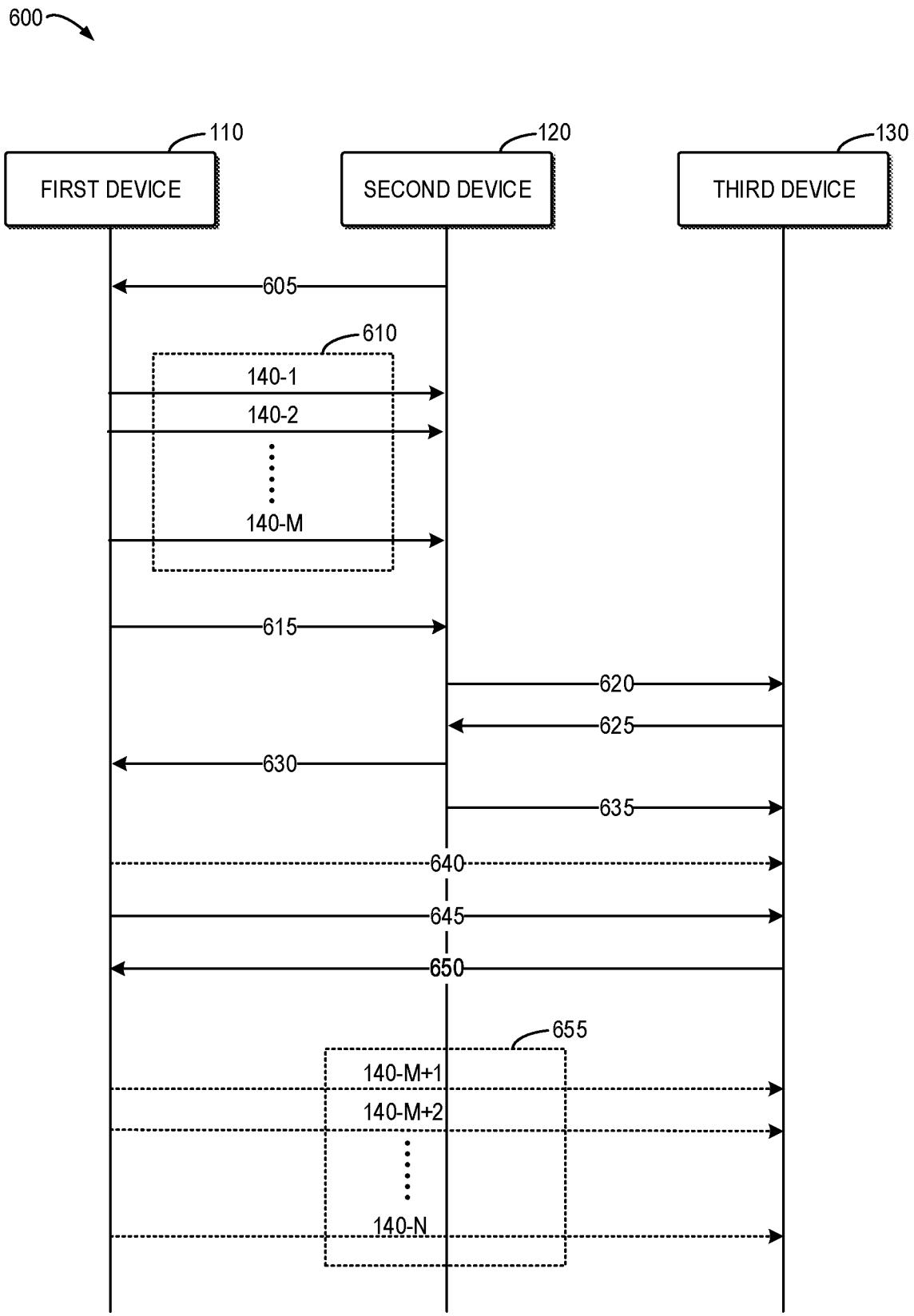
FIG. 6 illustrates another example communication process among a first device, a second device, and a third device in accordance with some example embodiments of the present disclosure.

FIG. 6 illustrates another example communication process 600 among the first device 110, the second device 120, and the third device 130 in accordance with some example embodiments of the present disclosure. The communication process 600 may be considered as another example embodiment of the communication process 500 as shown in FIG. 5, such as, for the scenario in which the first device 110 is handed over from the second device 120 to the third device 130. For the purpose of discussion, the communication process 600 will be described with reference to FIG. 1. However, it would be appreciated that the communication process 600 may be equally applicable to other communication scenarios where segmentation of information is performed for transmitting the information.

As shown in FIG. 6, the second device 120 transmits 605 to the first device 110 a "UECapabilityEnquiry" message as defined in the 3GPP specifications. The first device 110 transmits 610 to the second device 120 the messages 140-1 to 140-M. The first device 110 transmits 615 to the second device 120 a "MeasurementReport" message as defined in the 3GPP specifications. The second device 120 transmits 620 to the third device 130 a "HandoverPreparationInformation" message as defined in the 3GPP specifications. The third device 130 transmits 625 to the second device 120 a "HandoverCommand" message as defined in the 3GPP specifications. The second device 120 transmits 630 to the first device 110 an "RRCRecongifuration" message as defined in the 3GPP specifications. The second device 120 transmits 635 to the third device 130 a "SN STATUS TRANSFER" message as defined in the 3GPP specifications for transferring the messages 140-1 to 140-M. The first device 110 initiates 640 a RACH access to the third device 130. The first device 110 transmits 645 to the third device 130 an "RRCReconfigurationComplete" message as defined in the 3GPP specifications. The third device 130 transmits 650 to the first device 110 a "UECapabilityEnquiry" message as defined in the 3GPP specifications, which may include a sequence number of the message to be transmitted from the first device 110 to the third device 130. The first device 110 transmits 655 to the third device 130 the messages 140-M+1 to 140-N.

Figure 7:
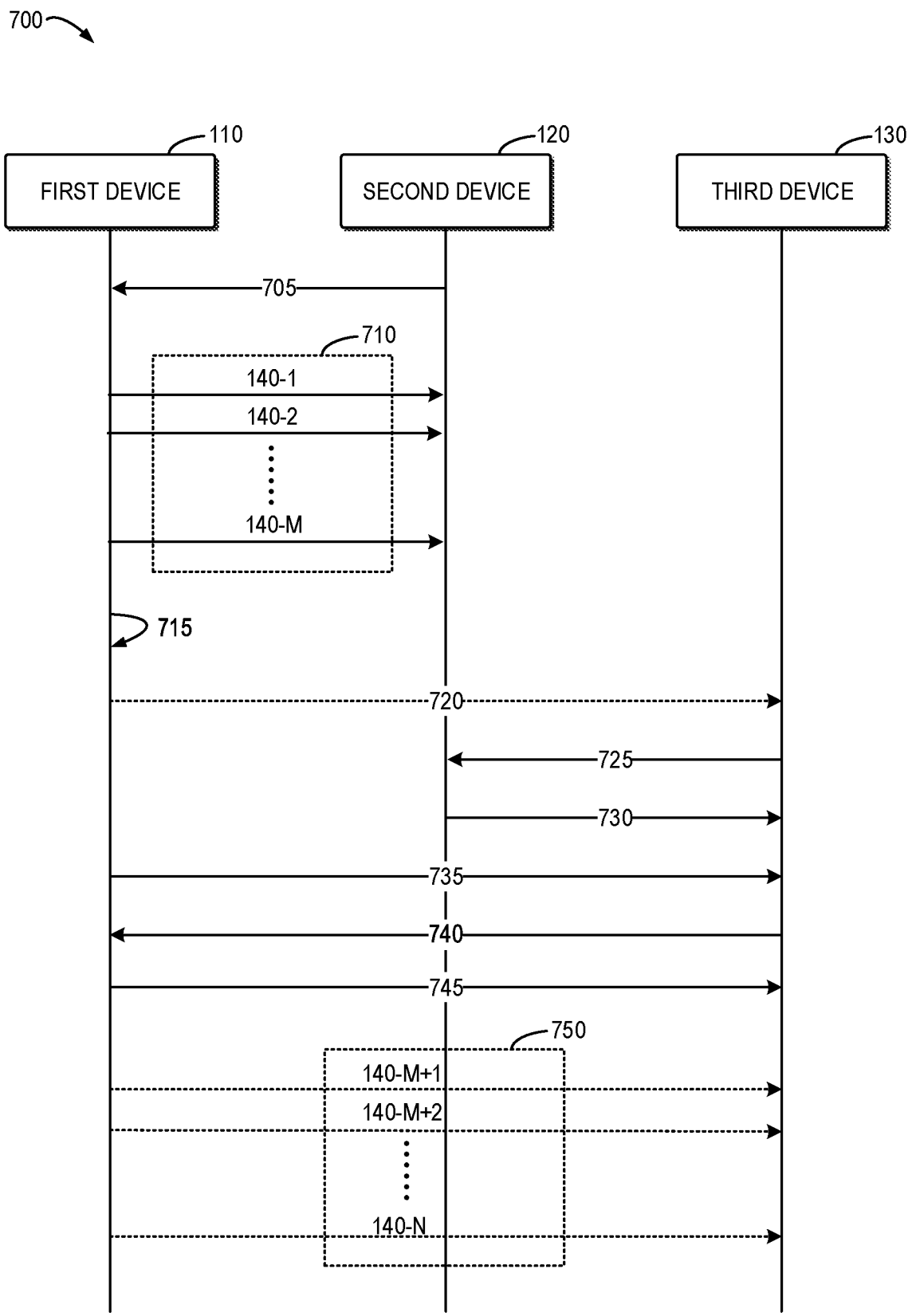
FIG. 7 illustrates another example communication process among a first device, a second device, and a third device in accordance with some example embodiments of the present disclosure.

FIG. 7 illustrates another example communication process 700 among the first device 110, the second device 120, and the third device 130 in accordance with some example embodiments of the present disclosure. The communication process 700 may be considered as another example embodiment of the communication process 500 as shown in FIG. 5, such as, for the scenario in which the first device 110 re-establishes a communication connection to the third device 130. For the purpose of discussion, the communication process 700 will be described with reference to FIG. 1. However, it would be appreciated that the communication process 700 may be equally applicable to other communication scenarios where segmentation of information is performed for transmitting the information.

As shown in FIG. 7, the second device 120 transmits 705 to the first device 110 a "UECapabilityEnquiry" message as defined in the 3GPP specifications. The first device 110 transmits 710 to the second device 120 the messages 140-1 to 140-M. The first device 110 initiates 715 a re-establishment procedure associated with the third device 130, for example, due to a detected radio link failure. The first device 110 initiates 720 a RACH access to the third device 130. The third device 130 transmits 725 to the second device 120 a "RETRIEVE UE CONTEXT REQUEST" message as defined in the 3GPP specifications. The second device 120 transmits 730 to the third device 130 a "RETRIEVE UE CONTEX RESPONSE" message as defined in the 3GPP specifications, which may include the messages 140-1 to 140-M and/or a sequence number of the next message to be received. The first device 110 transmits 735 to the third device 130 an "RRCReestablishmentRequest" message as defined in the 3GPP specifications. The third device 130 transmits 740 to the first device 110 an "RRCReestablishment" message as defined in the 3GPP specifications, which may include a sequence number of the message to be transmitted from the first device 110 to the third device 130. The first device 110 transmits 745 to the third device 130 an "RRCReestablishmentComplete" message as defined in the 3GPP specifications. The first device 110 transmits 750 to the third device 130 the messages 140-M+1 to 140-N.

Figure 8:
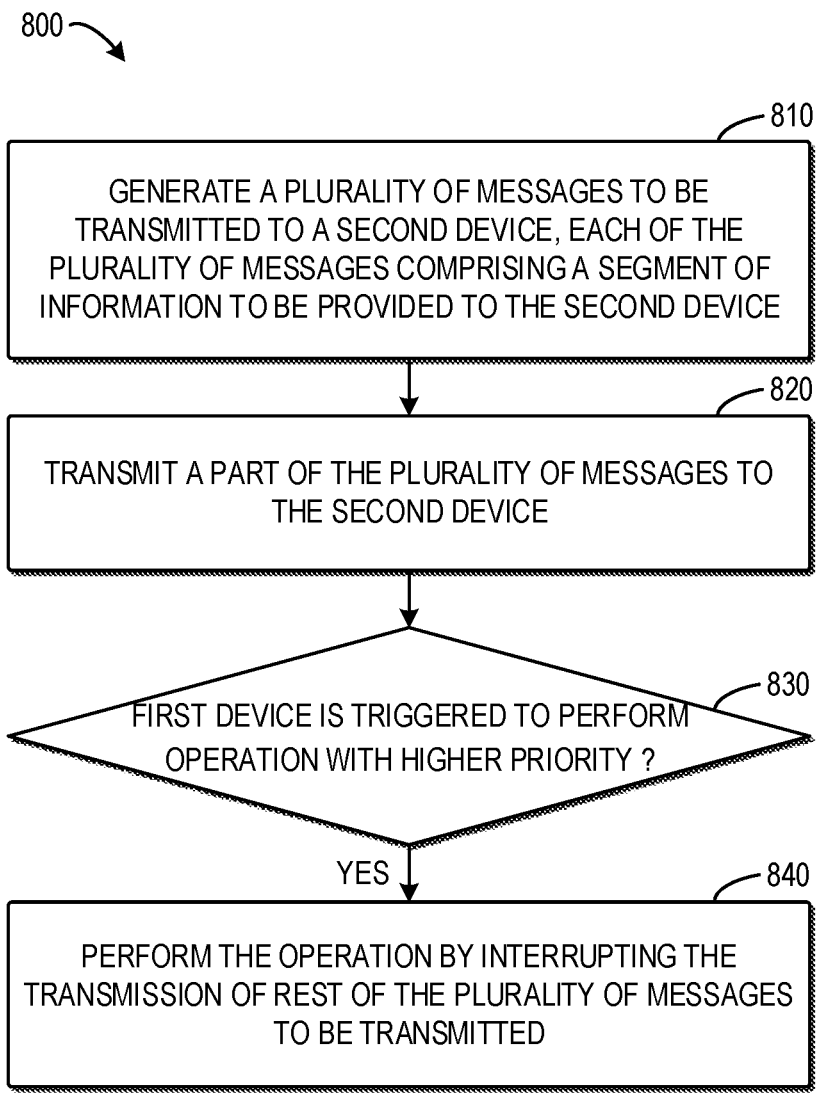
FIG. 8 illustrates a flowchart of an example method in accordance with some example embodiments of the present disclosure.

FIG. 8 illustrates a flowchart of an example method 800 in accordance with some example embodiments of the present disclosure. In some example embodiments, the method 800 can be implemented at a device in a communication network, such as the first device 110 as shown in FIG. 1. Additionally or alternatively, the method 800 can also be implemented at other devices shown in FIG. 1. In some other example embodiments, the method 800 may be implemented at devices not shown in FIG. 1. For the purpose of discussion, the method 800 will be described with reference to FIG. 1 as performed by the first device 110 without loss of generality.

At block 810, the first device 110 generates a plurality of messages to be transmitted to a second device 120. Each of the plurality of messages comprises a segment of information to be provided to the second device 120. At block 820, the first device 110 transmits a part of the plurality of messages to the second device 120. At block 830, the first device 110 determines whether it is triggered to perform an operation with a higher priority than the transmission of the plurality of messages. At block 840, in response to the first device 110 is triggered to perform an operation with a higher priority than the transmission of the plurality of messages, the first device 110 performs the operation by interrupting the transmission of rest of the plurality of messages to be transmitted.

In some example embodiments, the method 800 further comprises: storing the rest of the plurality of messages; and in response to completion of the operation, resuming the transmission of the rest of the plurality of messages.

In some example embodiments, resuming the transmission of the rest of the plurality of messages comprises: in response to the operation being a handover from the second device 120 to a third device 130 or a re-establishment of a communication connection to the third device 130, transmitting the rest of the plurality of messages to the third device 130.

In some example embodiments, transmitting the rest of the plurality of messages comprises: receiving, from the third device 130, a sequence number of a message to be transmitted from the first device to the third device 130; and starting the transmission of the rest of the plurality of messages by transmitting the message having the sequence number to the third device 130.

In some example embodiments, the method 800 further comprises: in response to the operation being the re-establishment of the communication connection to the third device 130, transmit to the third device 130 an indication indicating that the transmission of the rest of the plurality of messages is interrupted.

In some example embodiments, resuming the transmission of the rest of the plurality of messages comprises: in response to the operation being a re-establishment of a communication connection to the second device 120, transmitting the rest of the plurality of messages to the second device 120.

In some example embodiments, transmitting the rest of the plurality of messages comprises: receiving, from the second device 120, a sequence number of a message to be transmitted from the first device to the second device 120; and starting the transmission of the rest of the plurality of messages by transmitting the message having the sequence number to the second device 120.

In some example embodiments, the method 800 further comprises: discarding the rest of the plurality of messages.

In some example embodiments, the first device 110 discards the rest of the plurality of messages in response to expiration of a predefined period for transmitting the plurality of messages.

In some example embodiments, the operation comprises at least one of: a measurement of a communication channel, a handover between different network devices, or a re-establishment of a communication connection.

In some example embodiments, the information comprises radio capability information of the first device.

Figure 9:
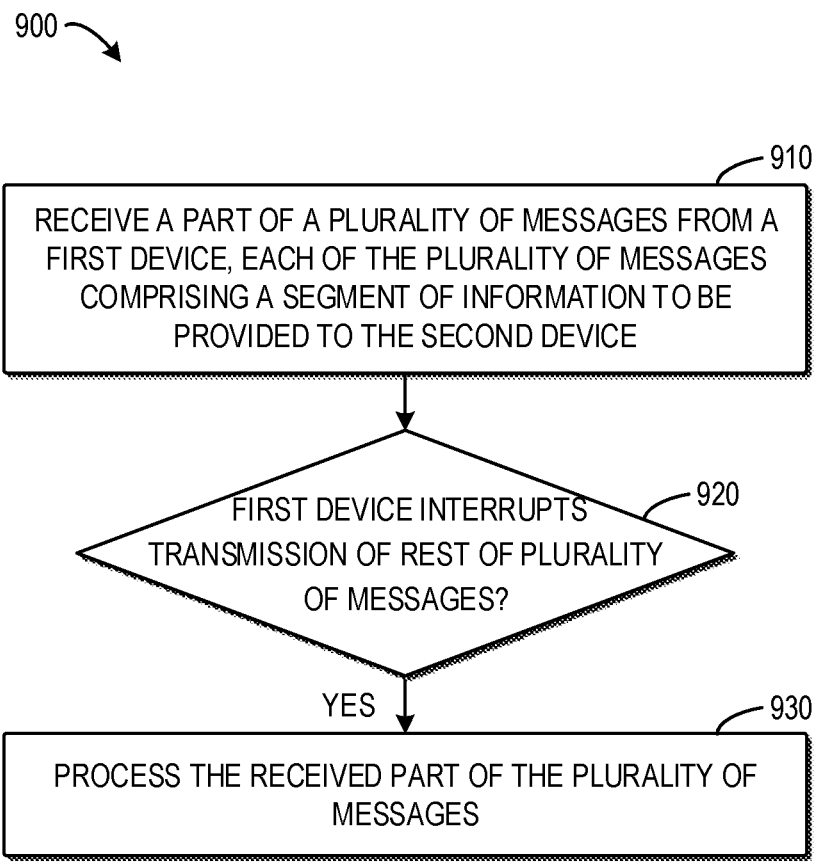
FIG. 9 illustrates a flowchart of another example method in accordance with some example embodiments of the present disclosure.

FIG. 9 illustrates a flowchart of another example method 900 in accordance with some example embodiments of the present disclosure. In some example embodiments, the method 900 can be implemented at a device in a communication network, such as the second device 120 as shown in FIG. 1. Additionally or alternatively, the method 900 can also be implemented at other devices shown in FIG. 1. In some other example embodiments, the method 900 may be implemented at devices not shown in FIG. 1. For the purpose of discussion, the method 900 will be described with reference to FIG. 1 as performed by the second device 120 without loss of generality.

At block 910, the second device 120 receives a part of a plurality of messages from a first device 110. Each of the plurality of messages comprises a segment of information to be provided to the second device 120. At block 920, the second device 120 determines whether the first device 110 interrupts the transmission of rest of the plurality of messages to perform an operation with a higher priority than the transmission of the plurality of messages. At block 930, in response to the first device 110 interrupting the transmission of rest of the plurality of messages to perform an operation with a higher priority than the transmission of the plurality of messages, the second device 120 processes the received part of the plurality of messages.

In some example embodiments, processing the received part of the plurality of messages comprises: in response to the operation being a re-establishment of a communication connection to the second device 120, storing the received part of the plurality of messages.

In some example embodiments, the method 900 further comprises: in response to completion of the re-establishment, transmitting to the first device 110 a sequence number of a message to be transmitted from the first device 110 to the second device 120.

In some example embodiments, processing the received part of the plurality of messages comprises: in response to the operation being a handover from the second device 120 to a third device 130 or a re-establishment of a communication connection to the third device 130, transmitting the received part of the plurality of messages to the third device 130; or transmitting, to the third device 130, an indication indicating that the transmission of the plurality of messages is interrupted.

In some example embodiments, the method 900 further comprises: transmitting, to the third device 130, respective sequence numbers of the received part of the plurality of messages.

In some example embodiments, processing the received part of the plurality of messages comprises: discarding the received part of the plurality of messages.

Figure 10:
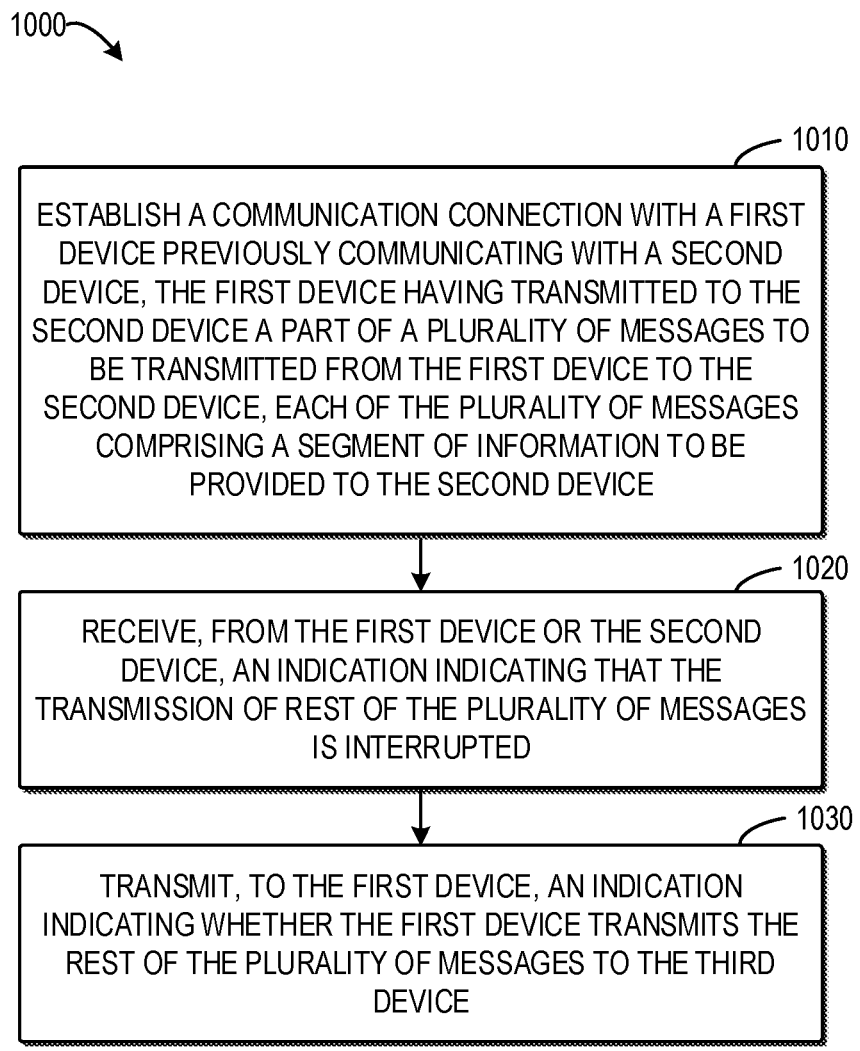
FIG. 10 illustrates a flowchart of another example method in accordance with some example embodiments of the present disclosure.

FIG. 10 illustrates a flowchart of another example method 1000 in accordance with some example embodiments of the present disclosure. In some example embodiments, the method 1000 can be implemented at a device in a communication network, such as the third device 130 as shown in FIG. 1. Additionally or alternatively, the method 1000 can also be implemented at other devices shown in FIG. 1. In some other example embodiments, the method 1000 may be implemented at devices not shown in FIG. 1. For the purpose of discussion, the method 1000 will be described with reference to FIG. 1 as performed by the third device 130 without loss of generality.

At block 1010, the third device 130 establishes a communication connection with a first device 110 previously communicating with a second device 120. The first device 110 has transmitted to the second device 120 a part of a plurality of messages to be transmitted from the first device 110 to the second device 120. Each of the plurality of messages comprising a segment of information to be provided to the second device 120. At block 1020, the third device 130 receives, from the first device 110 or the second device 120, an indication indicating that the transmission of rest of the plurality of messages is interrupted. At block 1030, the third device 130 transmits, to the first device 110, an indication indicating whether the first device 110 transmits the rest of the plurality of messages to the third device 130.

In some example embodiments, the indication comprises: the part of the plurality of messages received by the second device 120.

In some example embodiments, the method 1000 further comprises: transmitting to the first device 110 a sequence number of a message to be transmitted from the first device 110 to the third device 130.

In some example embodiments, an apparatus capable of performing the method 800 (for example, the first device 110) may comprise means for performing the respective steps of the method 800. The means may be implemented in any suitable form. For example, the means may be implemented in a circuitry or software module.

In some example embodiments, the apparatus comprises means for generating, at a first device, a plurality of messages to be transmitted to a second device, each of the plurality of messages comprising a segment of information to be provided to the second device; means for transmitting a part of the plurality of messages to the second device; and means for, in response to the first device being triggered to perform an operation with a higher priority than the transmission of the plurality of messages, performing the operation by interrupting the transmission of rest of the plurality of messages to be transmitted.

In some example embodiments, the apparatus further comprises: means for storing the rest of the plurality of messages; and means for, in response to completion of the operation, resuming the transmission of the rest of the plurality of messages.

In some example embodiments, the means for resuming the transmission of the rest of the plurality of messages comprises: means for, in response to the operation being a handover from the second device to a third device or a re-establishment of a communication connection to the third device, transmitting the rest of the plurality of messages to the third device.

In some example embodiments, the means for transmitting the rest of the plurality of messages comprises: means for receiving, from the third device, a sequence number of a message to be transmitted from the first device to the third device; and means for starting the transmission of the rest of the plurality of messages by transmitting the message having the sequence number to the third device.

In some example embodiments, the apparatus further comprises: means for, in response to the operation being the re-establishment of the communication connection to the third device, transmitting to the third device an indication indicating that the transmission of the rest of the plurality of messages is interrupted.

In some example embodiments, the means for resuming the transmission of the rest of the plurality of messages comprises: means for, in response to the operation being a re-establishment of a communication connection to the second device, transmitting the rest of the plurality of messages to the second device.

In some example embodiments, the means for transmitting the rest of the plurality of messages comprises: means for receiving, from the second device, a sequence number of a message to be transmitted from the first device to the second device; and means for starting the transmission of the rest of the plurality of messages by transmitting the message having the sequence number to the second device.

In some example embodiments, the apparatus further comprises: means for discarding the rest of the plurality of messages.

In some example embodiments, the apparatus further comprises: means for discarding the rest of the plurality of messages in response to expiration of a predefined period for transmitting the plurality of messages.

In some example embodiments, the operation comprises at least one of: a measurement of a communication channel, a handover between different network devices, or a re-establishment of a communication connection.

In some example embodiments, the information comprises radio capability information of the first device.

In some example embodiments, an apparatus capable of performing the method 900 (for example, the second device 120) may comprise means for performing the respective steps of the method 900. The means may be implemented in any suitable form. For example, the means may be implemented in a circuitry or software module.

In some example embodiments, the apparatus comprises means for receiving, at a second device, a part of a plurality of messages from a first device, each of the plurality of messages comprising a segment of information to be provided to the second device; and means for, in response to the first device interrupting the transmission of rest of the plurality of messages to perform an operation with a higher priority than the transmission of the plurality of messages, processing the received part of the plurality of messages.

In some example embodiments, the means for processing the received part of the plurality of messages comprises: means for, in response to the operation being a re-establishment of a communication connection to the second device, storing the received part of the plurality of messages.

In some example embodiments, the apparatus further comprises: means for, in response to completion of the re-establishment, transmitting to the first device a sequence number of a message to be transmitted from the first device to the second device.

In some example embodiments, the means for processing the received part of the plurality of messages comprises: means for, in response to the operation being a handover from the second device to a third device or a re-establishment of a communication connection to the third device, transmitting the received part of the plurality of messages to the third device, or transmitting, to the third device, an indication indicating that the transmission of the plurality of messages is interrupted.

In some example embodiments, the apparatus further comprises: means for transmitting, to the third device, respective sequence numbers of the received part of the plurality of messages.

In some example embodiments, the means for processing the received part of the plurality of messages comprise: means for discarding the received part of the plurality of messages.

In some example embodiments, an apparatus capable of performing the method 1000 (for example, the third device 130) may comprise means for performing the respective steps of the method 1000. The means may be implemented in any suitable form. For example, the means may be implemented in a circuitry or software module.

In some example embodiments, the apparatus comprises: means for establishing, at a third device, a communication connection with a first device previously communicating with a second device, the first device having transmitted to the second device a part of a plurality of messages to be transmitted from the first device to the second device, each of the plurality of messages comprising a segment of information to be provided to the second device; means for receiving, from the first device or the second device, an indication indicating that the transmission of rest of the plurality of messages is interrupted; and means for transmitting, to the first device, an indication indicating whether the first device transmits the rest of the plurality of messages to the third device.

In some example embodiments, the indication comprises: the part of the plurality of messages received by the second device 120.

In some example embodiments, the apparatus further comprises: means for transmitting to the first device a sequence number of a message to be transmitted from the first device to the third device.

Figure 11:
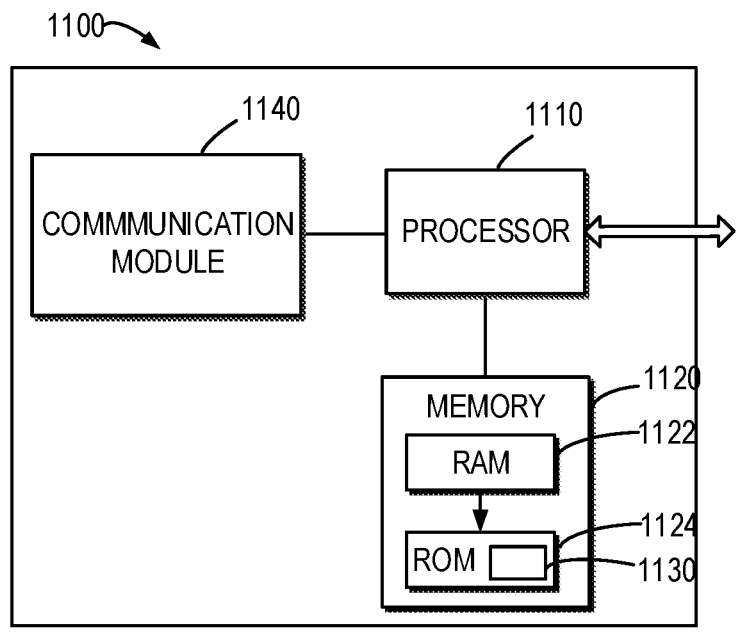
FIG. 11 illustrates a simplified block diagram of a device that is suitable for implementing example embodiments of the present disclosure.
Figure 12:
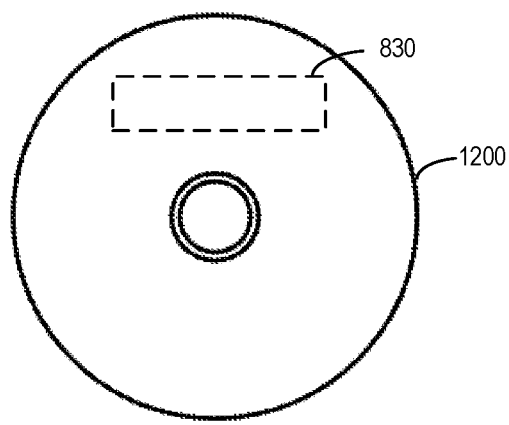
FIG. 12 illustrates a block diagram of an example computer readable medium in accordance with some example embodiments of the present disclosure.

FIG. 11 is a simplified block diagram of a device 1100 that is suitable for implementing example embodiments of the present disclosure. The device 1100 may be provided to implement the communication device, for example the first device 110, the second device 120, and the third device 130 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The example embodiments of the present disclosure may be implemented by means of the program 1130 so that the device 1100 may perform any process of the disclosure as discussed with reference to FIGS. 2 to 10. The example embodiments of the present disclosure may also be implemented by hardware or by a combination of software and hardware.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 11 shows an example of the computer readable medium 1200 in form of CD or DVD. The computer readable medium has the program 1130 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 800, 900, and 1000 as described above with reference to FIGS. 8-10. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory storing computer program codes;
   the at least one memory and the computer program codes being configured to, with the at least one processor, cause the first device to:
      generate a plurality of Radio Resource Control (RRC) messages to be transmitted to a second device, each of the plurality of RRC messages comprising a segment of information to be provided to the second device;
      transmit a part of the plurality of RRC messages to the second device; and
      in response to the first device being triggered to perform an operation with a higher priority than the transmission of the plurality of RRC messages, perform the operation by interrupting the transmission of rest of the plurality of RRC messages to be transmitted;
   wherein the first device is further caused to:
   store the rest of the plurality of RRC messages; and
   in response to completion of the operation, resume the transmission of the rest of the plurality of RRC messages;
   wherein the first device is caused to resume the transmission of the rest of the plurality of RRC messages by:
   in response to the operation being a handover from the second device to a third device or a re-establishment of a communication connection to the third device, transmitting the rest of the plurality of RRC messages to the third device; and
   wherein the first device is caused to transmit the rest of the plurality of RRC messages by:
   receiving, from the third device, a sequence number of a RRC message to be transmitted from the first device to the third device; and
   starting the transmission of the rest of the plurality of RRC messages by transmitting the message having the sequence number to the third device.

2. The first device of claim 1, wherein the first device is further caused to:
   in response to the operation being the re-establishment of the communication connection to the third device, transmit to the third device an indication indicating that the transmission of the rest of the plurality of RRC messages is interrupted.

3. The first device of claim 1, wherein the first device is caused to resume the transmission of the rest of the plurality of RRC messages by:
   in response to the operation being a re-establishment of a communication connection to the second device, transmitting the rest of the plurality of RRC messages to the second device.

4. The first device of claim 3, wherein the first device is caused to transmit the rest of the plurality of RRC messages by:
   receiving, from the second device, a sequence number of a RRC message to be transmitted from the first device to the second device; and
   starting the transmission of the rest of the plurality of RRC messages by transmitting the message having the sequence number to the second device.

5. The first device of claim 1, wherein the first device is further caused to:
   discard the rest of the plurality of RRC messages.

6. The first device of claim 5, wherein the first device is caused to discard the rest of the plurality of RRC messages in response to expiration of a predefined period for transmitting the plurality of RRC messages.

7. The first device of claim 1, wherein the operation comprises at least one of:
   a measurement of a communication channel,
   a handover between different network devices, or
   a re-establishment of a communication connection.

8. The first device of claim 1, wherein the information comprises radio capability information of the first device.

9. A second device, comprising:
   at least one processor; and
   at least one memory storing computer program codes;
   the at least one memory and the computer program codes being configured to, with the at least one processor, cause the second device to:
      receive a part of a plurality of RRC messages from a first device, each of the plurality of RRC messages comprising a segment of information to be provided to the second device; and
      in response to the first device interrupting the transmission of rest of the plurality of RRC messages to perform an operation with a higher priority than the transmission of the plurality of RRC messages, process the received part of the plurality of RRC messages;
   wherein the second device is caused to process the received part of the plurality of RRC messages by:
   in response to the operation being a re-establishment of a communication connection to the second device, storing the received part of the plurality of RRC messages;
   wherein the second device is further caused to:
   in response to completion of the re-establishment, transmit to the first device a sequence number of a RRC message to be transmitted from the first device to the second device.

10. The second device of claim 9, wherein the second device is caused to process the received part of the plurality of RRC messages by:

in response to the operation being a handover from the second device to a third device or a re-establishment of a communication connection to the third device,
transmitting the received part of the plurality of RRC messages to the third device; or
transmitting, to the third device, an indication indicating that the transmission of the plurality of RRC messages is interrupted.

11. The second device of claim 10, wherein the second device is further caused to:

transmit, to the third device, respective sequence numbers of the received part of the plurality of RRC messages.

12. The second device of claim 9, wherein the second device is caused to process the received part of the plurality of RRC messages by:

discarding the received part of the plurality of RRC messages.

13. A third device, comprising:

at least one processor; and
at least one memory storing computer program codes;
the at least one memory and the computer program codes being configured to, with the at least one processor, cause the third device to:
establish a communication connection with a first device previously communicating with a second device, the first device having transmitted to the second device a part of a plurality of RRC messages to be transmitted from the first device to the second device, each of the plurality of RRC messages comprising a segment of information to be provided to the second device;
receive, from the first device or the second device, an indication indicating that the transmission of rest of the plurality of RRC messages is interrupted; and
transmit, to the first device, an indication indicating whether the first device transmits the rest of the plurality of RRC messages to the third device;
wherein the indication comprises:
the part of the plurality of RRC messages received by the second device;
wherein the third device is further caused to:
transmit to the first device a sequence number of a RRC message to be transmitted from the first device to the third device.

\* \* \* \* \*